United States Patent [19]
Adamek

[11] 3,818,081
[45] June 18, 1974

[54] SEPARATION OF DICARBOXYLIC ACIDS
[75] Inventor: Edward Georg Adamek, Toronto, Ontario, Canada
[73] Assignee: DuPont of Canada Limited, Montreal, Quebec, Canada
[22] Filed: Oct. 7, 1971
[21] Appl. No.: 187,511

[30] Foreign Application Priority Data
Oct. 15, 1970  Canada .................................. 95668

[52] U.S. Cl. ........ 260/537 P, 260/533 C, 260/537 R
[51] Int. Cl. ............................................ C07c 51/42
[58] Field of Search ..................... 260/537 P, 537 R

[56] References Cited
UNITED STATES PATENTS
2,283,991  5/1942  Hill .................................. 260/537 P
2,776,990  1/1957  Hines ............................... 260/537 P
2,962,527  11/1960  Chafetz et al. .................. 260/537 P
3,290,369  12/1966  Bonfield et al. ................. 260/537 P FOREIGN PATENTS OR APPLICATIONS
954,330  0/1956  Germany ........................... 260/561

Primary Examiner—Vivian Garner
Attorney, Agent, or Firm—William A. Hoffman

[57] ABSTRACT

A process for separating adipic acid from a mixture of adipic, glutaric and succinic acids which comprises treating the mixture of acids under substantially anhydrous conditions with less than the stoichiometric amount of ammonia for complete ammoniation, separating the glutaric and succinic acids in the form of their corresponding imides and recovering adipic acid.

9 Claims, No Drawings

SEPARATION OF DICARBOXYLIC ACIDS

BACKGROUND OF THE INVENTION

The invention concerns improvements in and relating to the "separation" of acids, and more particularly to separating an adipic acid component from mixtures thereof with glutaric and succinic acid components, in the normal chemical sense of obtaining at least two fractions, one of which has an increased proportion of adipic acid component, while another has an increased proportion of the other components.

Such a separation procedure is of commercial interest, especially when applicable to mixtures of acids obtained in the course of oxidizing cyclohexane to adipic acid, since glutaric and succinic acid components are obtained as by-products and especially for treating mother liquor containing acid mixtures, catalyst residues, and possibly other by-products, after much of the desired adipic acid has been recovered by crystallization. German Patent No. 954,330 (1956) describes the conversion of adipic acid to adipamide, and the other acids to their imides, by treatment with ammonia in aqueous solution or by bubbling ammonia gas through the molten mixture of acids at 150° to 200°C. for 3 to 4 hours, and then separating the resulting adipamide from the imides.

SUMMARY OF THE INVENTION

This invention provides a more advantageous process for separating an adipic acid component from mixtures thereof with glutaric and/or succinic acid components, especially such as are obtainable from catalytic oxidation of cyclohexane to adipic acid, and particularly mother liquor obtained by crystallizing adipic acid from such a reaction product, which comprises treating the mixture under substantially anhydrous conditions with ammonia in less then the stoichiometric amount required for complete ammoniation. Seemingly, the ammonia reacts preferentially with the glutaric and/or succinic acid components to form the corresponding imides, as contrasted with the adipic acid component. The imides are separated from the ammoniated mixture by distillation or other suitable technique such as fractional crystallization or selective solvent extraction, and the adipic acid component is recovered predominantly in the form of adipic acid.

The reaction is preferably carried out continuously or batch-wise by bubbling dry ammonia gas through a molten mixture of the acids, in the absence of any solvent, if desired using a mixture of ammonia gas with an inert diluent e.g. nitrogen, thus removing by-product water as it is formed and, if desired, distilling off at least some of the glutaric and succinic components, especially glutarimide and succinimide, which are relatively low-boiling. Reduced pressures assist in these desiderata, and are preferred, especially pressures of less than 25 mm. Hg absolute, but higher pressures, e.g. up to 100 mm. Hg absolute also give satisfactory results, as can be seen hereinafter. The optimum temperatures will depend on the other conditions, but temperatures of 170° to 215°C. are generally preferred, temperatures over 230°C. generally being undesirable because of side-reactions.

The amount of ammonia is of the essence of the present invention. By the stoichiometric amount is meant herein the amount of ammonia that would convert the glutaric and succinic components to their imides, and the adipic component to adipamide. Ideally only enough ammonia should be used to convert the glutaric and succinic components without converting any adipic acid, but it is generally more practical, and therefore preferred, to use somewhat more ammonia and convert some, but not all, of the adipic acid, especially since the resulting mixture of adipamide and any glutaric and succinic components remaining therewith may be passed, if desired with some or all of the adipic acid, to a suitable stage of an adipic acid manufacturing process. This may be an especially useful method of recycling catalyst residues and avoiding losses of adipic acid without the expense of a further separation step, some, at least, of the glutaric and succinic constituents having been distilled off in the course of the reaction with ammonia.

Glutarimide and succinimide may be recovered, e.g. by distillation, and further purified, or may be used without further treatment, e.g. as starting materials for catalytic reduction with hydrogen to the corresponding cyclic lactams, as described in copending Canadian Ser. No. 091,927, filed Aug. 28, 1970.

The starting material mixtures may vary widely in composition. Any acids containing more than 6 carbon atoms that may be present may present problems of separation from the desired adipic acid, and inorganic acids may be undesirable in that they will tend to use up ammonia. As indicated above, a likely preferred starting material may be obtained in the course of a process of catalytic oxidation of cyclohexane to adipic acid, especially a mother liquor obtained by crystallizing out adipic acid from a product obtained from such a process, with the fraction rich in adipic acid component being recycled, if desired.

DESCRIPTION OF PREFERRED EMBODIMENTS

The process, and its preferred embodiments, are further illustrated in the following Examples. All parts and percentages are by weight, except as otherwise indicated. The pressures are given in mm. Hg absolute. The reactions were carried out in glass reaction vessels of 2-litre capacity.

The amounts of the carboxylic acids recovered are given as percentages of the amounts charged. The carboxylic acids were analyzed as esters on a calibrated gas chromatograph, after esterification with methanol, using a non-aqueous medium and boron trifluoride as catalyst, to convert not only the acids themselves, but also their derivatives, such as amides, imides and anhydrides to the esters. The accuracy is believed to be ± 10%, but may be less accurate at high concentrations.

EXAMPLE I 650 g. of mother liquor, containing 46% adipic acid, 32.5% glutaric acid and 13.5% succinic acid, with 2.8% of mixed catalyst residues containing salts of copper and vanadium, and 0.4% of water, were dried by heating in the reaction vessel for 1 hour to 185° to 195°C. under a pressure of 50 mm., with stirring and nitrogen bubbling through to give 34 g. of a first white crystalline distillate and a trace of water. Then 2 moles of dry ammonia gas (i.e. 30% of stoichiometric amount), preheated to 170°C., were passed through the vigorously stirred mixture at a temperature of 185° to 190°C. and under a pressure of 57 mm., over 1.5 hours, the by-product water being carried off, followed by nitrogen for a further 1.5 hours, the mixture being at a temperature of 190° to 200°C. and under a pressure of 66 mm. to give 76 g. of a second white crystalline distillate and 479 g. of residue, all of which analyzed as follows:

Amounts of Acid Components Recovered as Percentages of Starting Amounts

| Material | Weight (g) | Adipic % | Glutaric % | Succinic % |
|---|---|---|---|---|
| 1st distillate | 34 | 0.5 | 1.1 | 34.6 |
| 2nd distillate | 76 | 1.6 | 23.9 | 19.7 |
| Residue | 479 | 97.9 | 75 | 16.3 |

Thus, the bulk of the adipic component remained in the residue and, furthermore almost 80% of this adipic component of the residue was in the free acid form and was therefore, easily separable from the succinic and glutaric imides.

EXAMPLE II

Essentially the same procedure was followed with 540 g. of mother liquor, containing, however, 42% adipic acid, 40% glutaric acid and 15% succinic acid. The first drying step was for 2 hours at 170° to 190°C. under 50 to 60 mm. pressure and gave 14 g. of first distillate. The ammonia was preheated to 118°C., and was used in amount 3.1 moles (50% of stoichiometric amount), over 3.5 hours, while the mixture was at 190° to 195°C. under 55 to 60 mm. pressure to give 147 g. of second distillate. The preheated nitrogen was then passed through for a further 2 hours, the mixture being at 180° to 200°C. and under 54 mm. pressure to give 59 g. of a third distillate, and 309 g. of grey crystalline residue.

Amounts of Acids Components Recovered as Percentages of Starting Materials

| Material | Weight (g) | Adipic % | Glutaric % | Succinic % |
|---|---|---|---|---|
| 1st distillate | 14 | 0.2 | 2.3 | 30.5 |
| 2nd distillate | 147 | 3.0 | 55.6 | 39.1 |
| 3rd distillate | 59 | 3.4 | 28.8 | 8.4 |
| Residue | 309 | 93.5 | 19.6 | 20.5 |

About 85% of the adipic component in the residue was in the free acid form.

EXAMPLE III

Similarly 500 g. of a mixture of adipic acid (25%), glutaric acid (50%) and succinic acid (25%) was heated to 180°C. under a pressure of 11 mm., and then dry ammonia was passed in for 3.5 hours in 70% of the stoichiometric amount to give 433 g. of distillate, containing 25.3%, 95.2% and 49.3% of the starting amounts of the adipic, glutaric and succinic components, while the residue contained 62.3%, 4.8% and 1.8% of the starting amounts of the adipic, glutaric and succinic components. Just over 40% of the adipic component in the residue was in the free acid form. Only about 9% and 7% of the glutaric and succinic components, respectively, in the distillate were in the free acid form.

In a modification of the present invention, the ammonia may be provided, at least in part, from adipamide, which reactions are exemplified below.

A. A mixture of 6 g. adipamide and 4.8 g. of succinic acid was heated to 182°C. in a glass reaction vessel to give conversions of the succinic acid to succinimide of about 40%, after 70 minutes, and about 85%, after 3.5 hours.

B. A mixture of 8 g. adipamide and 7 g. of glutaric acid was heated to 230°C. in a glass reaction vessel to give conversions of the glutaric acid to glutarimide of 63%, after only 14 minutes, and up to about 90% after 70 minutes.

Thus any adipamide recovered from the reaction of the acid mixture with ammonia, if desired in admixture with succinic and glutaric components, may be recycled to the reaction, or ammonia may be provided in the form of adipamide derived from other sources:

I claim:

1. A process for separating adipic acid from a mixture comprising an adipic acid first component and a second component comprising at least one acid of the group consisting of glutaric acid and succinic acids which comprises treating the mixture under substantially anhydrous conditions and at a temperature in the range of 170°C. to 230°C. with anhydrous ammonia gas in an amount between that stoichiometrically required for substantially complete ammoniation of the acids of the second component but less than that stoichiometrically required for complete ammoniation of the combined acids of the second component and the adipic acid component, separating at least part of the second acid component in the form of the corresponding imide, and recovering the first component predominantly in the form of adipic acid.

2. The process of claim 1 wherein the second component is separated by distilling the ammoniated mixture at less than atmospheric pressure.

3. The process of claim 1 wherein at least part of the ammonia is provided in situ by conversion of adipamide to adipic acid.

4. The process of claim 2 wherein the temperature is in the range of 170°C. to 215°C.

5. The process of claim 4 wherein the pressure is less than 100 mm Hg absolute.

6. The process of claim 5 wherein the pressure is less than 25 mm Hg absolute.

7. The process of claim 4 wherein the acid mixture to be separated comprising adipic, glutaric and succinic acids is obtained by catalytic oxidation of cyclohexane.

8. The process of claim 7 wherein the acid mixture to be separated is a mother liquor obtained by crystallization of adipic acid from the mixture of adipic, glutaric and succinic acids produced by catalytic oxidation of cyclohexane.

9. The process of claim 7 wherein the resulting adipic acid component is recycled into a stage of the catalytic oxidation of cyclohexane to adipic acid.

* * * * *